Aug. 9, 1966  J. F. NORTON  3,265,855
METHOD AND APPARATUS FOR DRILLING SMALL HOLES
Filed April 1, 1963  2 Sheets-Sheet 1
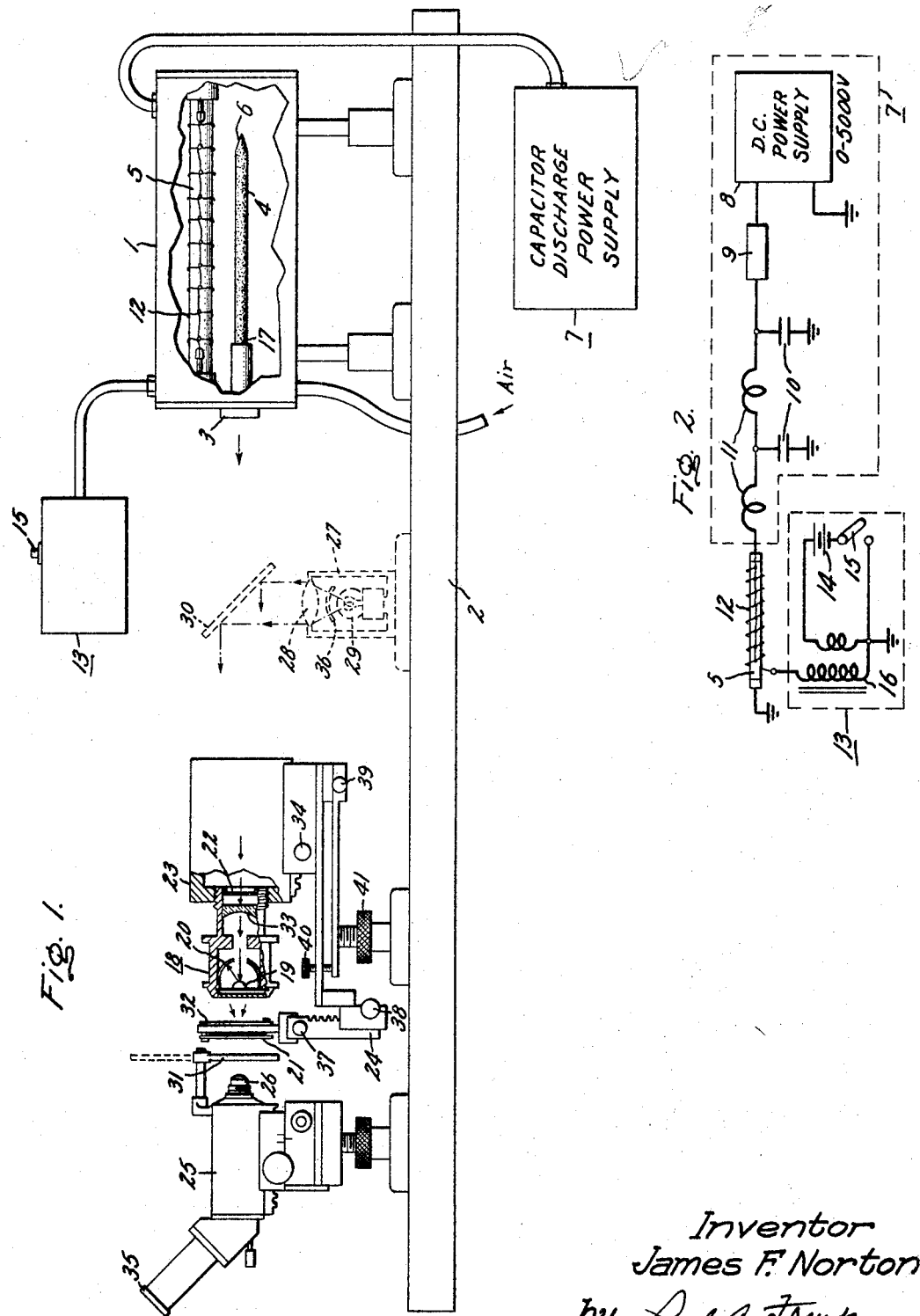
Inventor
James F. Norton
by Paul A. Frank
His Attorney Inventor:
James F. Norton,
by Paul J. Franke
His Attorney.

3,265,855
METHOD AND APPARATUS FOR DRILLING
SMALL HOLES
James Frederic Norton, Alplaus, N.Y., assignor to General Electric Company, a corporation of New York
Filed Apr. 1, 1963, Ser. No. 269,650
11 Claims. (Cl. 219—121)

My invention relates to a method and apparatus for forming relatively small holes through a material by employing a pulsed laser beam and, in particular, to a method and apparatus in which holes of size in the order of 0.001 inch diameter may be formed in materials such as tungsten and molybdenum.

The production of holes of size in the order of 0.001 inch diameter or smaller is a necessary fabrication step in the manufacture of electron beam apertures. These apertures find use in instruments such as flying spot scanners, high resolution cathode ray tubes, thermoplastic recorders, and electron microscopes, and the minimum cross-sectional areas of the electron beams employed in these instruments is limited by the apertures used therein. These apertures are conventionally fabricated in platinum, tungsten, or molybdenum by utilizing a micro-drilling technique. The difficulty in producing apertures smaller than 0.001 inch diameter increases rapidly with smaller size holes. Refractory materials, such as tungsten and molybdenum are excellent for electron beam apertures but their machineability is poor, rendering the drilling of holes smaller than 0.001 inch in tungsten virtually impossible. Another technique for making apertures requires an electron beam to do the actual hole forming. The difficulties here include the fact that the equipment is relatively expensive and the work must be done in a vacuum.

An optical maser device which is now referred to as a laser (light amplification by stimulated emission of radiation), has the property of producing a high intensity, collimated, coherent beam of light. This beam can be focused to produce extremely high energy densities and as a result, very high temperatures may be generated. This phenomenon may be applied to the forming of holes of such small size as are not generally attainable, especially in a low cost method of forming these holes.

Therefore, an object of my invention is to provide a method for forming relatively small holes by employing a laser beam.

A further object of my invention is to provide a new method and apparatus for forming relatively small holes which are suitable for electron beam apertures, the method employing a pulsed laser beam which is focused on the material to be pierced.

In accordance with my invention in meeting the objects enumerated above, my method of forming relatively small holes in which a pulsed laser beam is focused on the material to be pierced comprises in general, the steps of positioning a material to be pierced at the focal point or a selected distance from the focal point of a reflecting objective lens, positioning a limiting aperture intermediate the laser device and the reflecting objective lens, and focusing a pulsed laser beam by means of the lens upon the material. The size of the holes formed is determined primarily by three factors: controlling the amount of electrical energy supplied to a flash lamp which optically pumps and thereby initiates the pulsed beam from the laser, the size of the limiting aperture which adjusts the cross section of the laser beam, and the distance at which the material to be pierced is positioned relative to the focal point of the reflecting objective lens. Increasing the amount of electrical energy supplied to the flash lamp or positioning the material to be drilled at a point removed from the focal point of the reflecting objective lens produces holes having relatively larger cross-sectional areas. Holes having a diameter as small as 0.001 inch diameter are readily obtained by my method, and holes as small as 0.0002 inch diameter have been obtained.

The apparatus with which my method of forming small holes is practiced comprises a body of laser material such as a synthetic ruby rod and a flash lamp in optical communication therewith. The flash lamp is connected to a delay line or pulse shaping circuit which is connected to the output of a controllable direct current power supply. Closure of a push button circuit causes a spark to ionize gas within the flash lamp, which in turn activates the laser and generates a pulsed laser beam therefrom. An auto-collimator, whose output is projected upon a partially reflective mirror positioned within the optical path of the laser beam, is employed to align the reflecting objective lens with the output of the laser. A microscope is utilized for accurately adjusting the focus of the pulsed laser beam on the material to be pierced.

The features of my invention which I desire to protect herein are pointed out with particularity in the appended claims. The invention itself, however, both as to its organization and method of operation, together with further objects and advantages thereof, may best be understood by reference to the following description taken in connection with the accompanying drawings, wherein like parts in each of the several figures are identified by the same reference character, and wherein:

FIGURE 1 is a diagrammatic view, partly broken away, of an apparatus for forming holes and constructed in accordance with my invention;

FIGURE 2 is a schematic diagram of the power supply circuit for the flash lamp;

Figure 4:
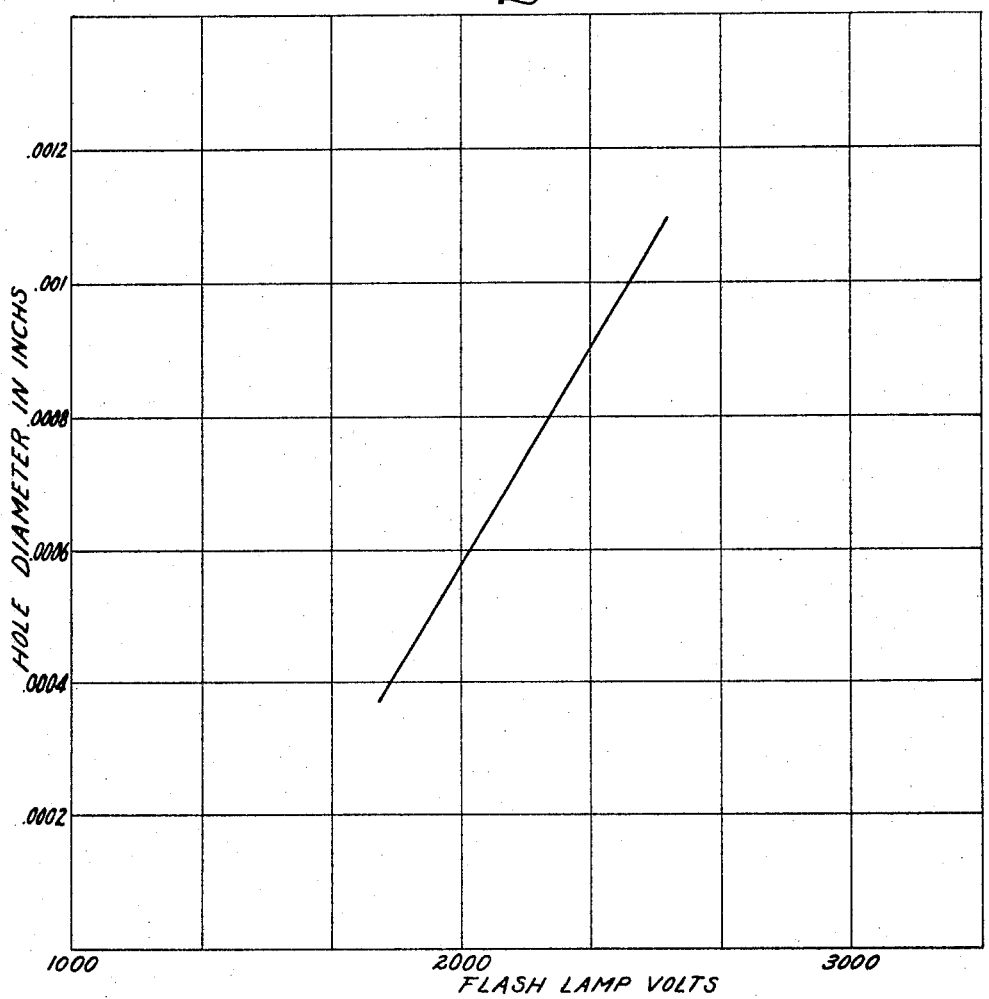
FIGURE 4 is a graph indicating the size of the holes formed as a function of the magnitude of the voltage applied to the flash lamp.

Referring particularly to the apparatus illustrated in FIGURE 1 there is shown the essential elements of an optical system employing a laser device which is useful for forming, or as will be referred to hereinafter, drilling relatively small holes in a material in accord with my invention. A cylindrical housing designated by numeral 1, is rigidly supported on a base member 2 conventionally known as an optical bench. An aperture 3, preferably of circular configuration, is located in one end of housing 1 and in alignment with the optical axis of a body of laser material 4 positioned within the housing. The laser material consists of a synthetic ruby comprising chromium ions in a host crystal of aluminum oxide in the configuration of a cylindrical rod. It should be appreciated that various other materials may be employed for the active medium of the laser. The inner surface of housing 1 comprises an ellipsoidal reflector with the ruby rod being supported at one focus of the ellipsoid and a straight xenon flash lamp 5 supported at the other focus in the preferred embodiment. Housing 1 may also have an inner surface comprising a cylindrical reflecting inner surface. Helical flash lamps which surround the ruby rod may be utilized in place of the straight flash lamp in a housing having a cylindrical reflecting inner surface. A totally reflective prism such as a conventionally known Porro prism is optically coupled to an end of the laser rod to obtain a better collimated beam of light from the laser than is possible by merely employing reflective surfaces at the ends of housing 1. The Porro prism may comprise a separate prism (not shown) positioned external to housing 1 to permit external adjustment of the standing wave pattern in the laser, or comprise an integral part of the laser rod by being ground on the end 6 of the laser rod and oriented correctly with respect to the crystallographic "C" axis. Another totally reflective prism which may be employed is one known as a triple prism.

The terminals of flash lamp 5 are connected to a conventional capacitor discharge direct current power supply circuit designated as a whole by numeral 7. Circuit 7 is illustrated in greater detail in FIGURE 2 wherein a direct current power supply 8 is adapted to be adjustable in an operating voltage range 0 to 5,000 volts. The output of this power supply 8 is connected to a current limiting resistor 9 and a capacitor discharge circuit comprising capacitors 10 and small current limiting inductances 11 which limit the peak currents and rate of current rise to reasonable values of less than 5,000 amperes. The capacitor discharge circuit controls the amount and duration of electrical energy supplied to the flash lamp since it forms a delay line or pulse forming network. A fine electrically conductive wire 12 is wound on the outer surface of flash lamp 5 to provide uniform ionization of the gas contained within the flash lamp and thereby activate or optically pump the laser rod uniformly along its length. Electrical conductor 12 is connected to a relatively high voltage energizing circuit comprising battery 14, push button 15, and step-up transformer 16. Thus, each depression of push button 15 develops a pulse of voltage to transformer 16 wherein this output voltage in general exceeds the output voltage of power supply 8. The voltage across transformer 16 effects ionization of the gas within flash lamp 5 thereby rendering the gas conductive and providing a discharge path for the energy stored in capacitors 10. The discharge of capacitors 10 through inductances 11 generates a pulse of electrical energy which is impressed across flash lamp 5 and thereby produces a pulse of intense light therein. The flash lamp thereby optically pumps laser rod 4 which in turn generates a pulsed collimated beam of coherent light emitting from end 17 of the laser rod.

The pulsed collimated beam of coherent light travels along the optical axis of the laser from end 17 of laser rod 4 through aperture 3 of cylindrical housing 1 in the direction of a reflecting objective lens designated as a whole by numeral 18. This objective lens is positioned, in a manner to be described in greater detail hereinafter, for precise alignment with the collimated laser beam emitting from aperture 3. The reflecting objective lens provides a convenient and accurate means of focusing the laser beam onto the surface of a material to be drilled. Refractors are undesirable for the focusing of laser beams because of heating due to absorption of the large amount of energy which must be transmitted by the lens. Sufficient energy is absorbed in the refracting lens to discolor the cement and to ultimately crack the glass. A reflecting objective lens bypasses these difficulties since there is little absorption except by the reflective coating itself and the tolerance of these coatings to high intensity laser flashes is reasonably high. Irreparable damage in the form of pits over the surface of a glass lens and even on the reflecting coatings is eventually effected when the energy in the laser beam exceeds 4,000 joules/cm.$^2$. Further, the operation of the laser close to its threshold produces fewer modes and less divergence of the beam and, hence, a smaller hole. Thus, the energy in the laser beam should be maintained as low as practicable and still successfully drill holes in a particular material. Reflecting objective lens 18 comprises a convex mirror 19 which intercepts the pulsed laser beam and reflects it upon a concave mirror 20 disposed adjacent convex lens 19 and concentric to the axis thereof and of such curvature that the reflected pulsed laser beam is brought to an accurate focus on the material 21 to be drilled.

A limiting aperture 22, which comprises a material having a light-dispersion surface and aperture therethrough, as for example, a sheet of white paper and a hole therethrough, is positioned in alignment with housing aperture 3 and reflecting convex lens 19. The surface of aperture 22 is preferably of a nonheat-absorbing color such as white to retard heating effects in the aperture as the beam passes therethrough. Aperture 22 provides three distinctive functions. First, the configuration of this aperture may determine the configuration of the hole drilled within material 21. In the case wherein the smallest laser beam spot size is focused on material 21, the drilled hole is always round in cross section and, thus, independent of the configuration of aperture 22. However, increasing the spot size by defocusing the beam on the material produces a drilled hole having a cross section dependent on the configuration of aperture 22. Thus, aperture 22 may be circular or in the form of a cross or any other desired configuration. Secondly, the size of this aperture is chosen to select only the center of the radiated beam from the laser and thereby improve the collimation of the beam to determine a smaller spot size on the material 21 being drilled. Thirdly, in the absence of the limiting aperture, an outer portion of the laser beam may strike the darkened or back surface of concave mirror 20 and thereby vaporize some of the darkened material thereon. This vaporized material causes a resulting smudge on the reflecting surfaces and thereby greatly speeds destruction of the reflecting objective lens. For convenience, limiting aperture 22 and reflecting objective lens 18 may both be mounted in a conventional microscope body 23 and this body is supported on optical bench 2 and can be moved precisely in an axial direction along the optical axis of the laser beam by means of adjustment screw 34. A retaining member such as a graduated mechanical stage 24 is adapted to provide a holding means for material 21 to be drilled. This mechanical stage is provided with adjustment screws 37 and 38 for accurately positioning material 21 with respect to the reflecting objective lens in a transevrse direction to the optical axis of the laser beam. Although mechanical stage 24 may be independently supported on optical bench 2, it is preferably connected to the supporting member for microscope body 23, as shown, and the distance between lens 18 and material 21 is adjustable by means of adjustment screw 34.

A microscope 25 having cross hairs in the eyepiece 35 is mounted on optical bench 2 in a manner whereby the objective lens 26 of this microscope may be focused on material 21 to be drilled and thereby determine the focal point of reflecting objective lens 18. This microscope is also employed to obtain a precise transverse alignment of material 21 with respect to the laser beam and thereby accurately determine the particular spot on material 21 at which the hole is to be drilled. An autocollimator, designated as a whole by numeral 27 and indicated in phantom, is disposed intermediate laser 4 and limiting aperture 22 and supported on optical bench 2. An auto-collimator is a device comprising a housing having a convex lens 28 at one end thereof and a noncoherent light source 29 positioned at the focal point of lens 28 whereby the output of lens 28 comprises parallel rays of light. A reticle 36 which may be an image in the form of a cross or other suitable distinguishing design is positioned intermediate lens 28 and light source 29, preferably in close proximity to the source. The output of lens 28 is thus characterized in cross section by the distinguishing pattern or image of the reticle. A partially reflective mirror 30 is positioned on the optical axis of the laser beam and adapted to reflect the parallel rays of light emitted from lens 28 along the laser optical axis onto the convex lens 19 of the reflecting objective lens. Mirror 30 is disposed at a 45 degree angle relative to both the optical axis of the laser beam and of lens 28 and is preferably adapted to be removable from the optical axis of the laser beam after reflecting objective lens 18 is properly aligned in a manner to be described in detail hereinafter. An opaque shield 31 is mounted on microscope 25 adjacent objective lens 26 whereby during the drilling interval this objective lens is protected from any evaporated material emitted from the hole being drilled. In like manner, a transparent shield 32 is mounted on mechanical stage 24 intermediate reflecting objective lens 18 and material 21 for preventing any evaporated material from striking the reflecting objective lens.

The center of the laser beam tends to reflect back along the optical axis of the beam at the center of convex reflecting mirror 19. A single diverging lens 33 may be positioned on the reflecting objective lens side of limiting aperture 22 and aligned with the laser beam optical axis, thereby preventing the center of the laser beam from impinging on the center of the convex reflecting surface of mirror 19 and thus utilizing all of the optical energy available within the laser beam for drilling purposes.

The apparatus heretofore described is employed to form or drill relatively small holes by a method to be now disclosed. A precise alignment of the optical axis of reflecting objective lens 18 is necessary to drill a hole of the desired configuration. A noncoincidence between the optical axis of the reflecting objective lens and that of the laser beam results in drilled holes of undesired shape in material 21. Thus, the precise alignment of the reflecting objective lens is a first preliminary step to be once performed when establishing the positions of housing 1 and microscope body 23 on optical bench 2, and this alignment is accomplished in the following manner. A light or heat sensitive material, such as black or exposed photographic paper or black Polaroid paper, is positioned intermediate reflecting lens 18 and objective lens 26 along the optical axis of the laser beam at a point removed from the focal point of reflecting objective lens 18. Power supply 8 is initiated and the output voltage thereof adjusted to a selected value, as for example, 2,000 volts, whereby the magnitude of electrical energy stored in capacitors 10 and which initiates the pulsed laser beam is accurately controlled. A momentary depression of push button 15 effects a discharge of capacitors 10 through inductances 11 in pulse form wherein the pulse duration is determined by the values of the inductance and capacitance. This pulse of electrical energy having a predetermined peak and duration generates a controlled pulse of intense light within flash lamp 5, which in turn optically pumps laser material, rod 4, to a higher metastable energy level. The laser material almost immediately returns to a lower stable energy level while simultaneously emitting a pulsed collimated beam of coherent light in the direction of the material 21 to be drilled. The pulsed laser beam passes through aperture 3, limiting aperture 22 and is then reflected from the convex surface of lens 19 onto the reflecting surface of concave surface and, hence, onto the photographic paper upon which an out-of-focus image is burned by the laser beam. The pattern of this burned image is characteristic of the supporting structure for reflecting objective lens 18. Thus, the image appears as a segmented black area in the case where a spider member is employed, and this segmented pattern is symmetrical only when the reflecting objective lens is precisely aligned with the optical axis of the laser beam. The attitude of the lens is adjusted by means of adjustment screws 39, 40 and knurled nut 41 to establish the symmetrical pattern. Additional attitude adjustment controls may also be provided for further refinement in accuracy. The reflecting objective lens having once been aligned, there is no need for further aligning this lens.

A second preliminary step is employed to detect the focal point of the reflecting objective lens. The focal point of this lens may be determined by employing the laser beam and photographic paper in a similar manner as the preliminary step of the lens alignment, but more preferably, auto-collimator 27 and partially reflective mirror 30 disposed at a 45 degree angle thereto are employed to determine this focal point. The use of the auto-collimator permits a more rapid determination of the focal point due to the control of adjustment screw 34 being accomplished by a continuous motion rather than a noncontinuous movement as necessitated by intermittent laser flashes. By means of mirror 30, the auto-collimator directs its beam of collimated noncoherent light which has a distinguishing image in cross section as determined by reticle 63, along the optical axis of the laser beam and in the direction of the reflecting objective lens. Limiting aperture 22 may be removed thereby permitting this collimated light to occupy the full aperture of the reflecting objective lens.

The wax smeared surface of a transparent member, such as a microscope cover glass, is then mounted in mechanical stage 24 in a manner whereby the wax smeared surface faces the reflecting objective lens. Microscope 25 is focused through the back of this cover glass onto the smeared front surface on which the image of the auto-collimator reticle impinges. Adjustment screw 34 is then manipulated to obtain the sharpest focus of the reticle image as detected by microscope eyepiece 35. This step determines the focal point of the reflecting objective lens. Limiting aperture 22 may now be replaced, mirror 30 removed from the laser optical axis, the wax smeared cover glass removed from stage 24, and opaque shield 31 positioned to protect microscope lens 26.

The material 21 to be drilled is then placed and fastened within mechanical graduated stage 24. Material 21 may be a small sheet of thin metal such as molybdenum, tungsten, or platinum through which are to be drilled relatively small holes for particular applications such as electron beam apertures. The material 24 may be positioned either at the focal point of reflecting objective lens 18 in order to drill the smallest hole possible or at a selected distance from the focal point in order to produce a hole of predetermined larger size.

A hole is formed or drilled in material 21 by generating a laser pulse in the manner previously described and directing it at the material. A plurality of pulses may be required, depending upon the thickness and type of material being pierced. The size of the holes in cross section is controlled by the following factors in order of decreasing relative imporance, assuming perfect alignment of the reflecting objective lens with the optical axis of the laser beam:

(1) Voltage applied across the flash lamp.
(2) Size of the limiting aperture.
(3) Focus of the reflecting objective lens and the accuracy of positioning the material to be drilled at this focal point.
(4) Color of the surface of the material to be drilled.

Figure 3:
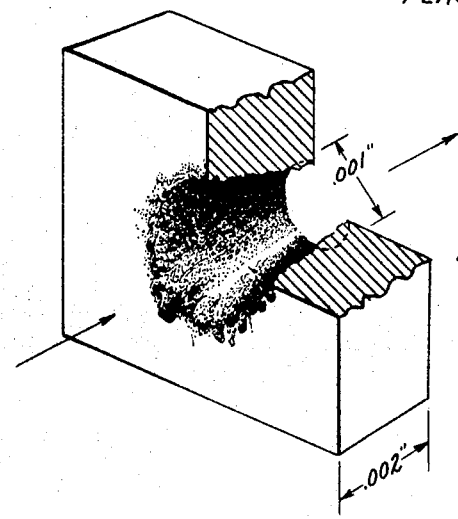
FIGURE 3 is a greatly magnified perspective view of a hole actually formed in accordance with the method of my invention.

FIGURE 3 is a greatly magnified perspective view of a hole having a diameter 0.001 inch drilled through a 2 mil tungsten plate employing specific components hereafter described. The pulsed laser beam enters the plate at the larger hole surface and exits from the smaller (0.001 inch diameter) hole surface. The perspective view is taken from photographs of the plate. Limiting aperture 22 consists of a circular hole of 0.1 inch diameter and it may be seen that the hole drilled through material 21 has a very nearly perfect circular cross section. Useful electron beam apertures in the size range 0.0002 to 0.002 inch have been produced with a pulsed laser beam in accordance with my invention. Although single laser pulses are often sufficient to drill holes, two pulses may conveniently be used to obtain a more circular and cleanly drilled hole. Reproducibility of the hole size may be consistently obtained by providing adequate cooling air flow over the ruby crystal to insure a constant ruby temperature. Holes drilled by the laser beam are slightly tapered as shown in FIGURE 3. This tapering effect may be minimized by employing a plurality of laser pulses to accomplish the drilling. This slight tapering effect is turned to advantage when the electron beam aperture is mounted in an electron gun, the small side of the drilled hole being positioned to face the incident electron beam and thereby minimizing internal reflections in the hole. The hole may be tapered in the other direction by positioning the material to be pierced intermediate the reflecting objective lens and its focal point. The thus diverging laser beam tapers the hole in the opposite direction from that shown in FIGURE 3.

FIGURE 4 indicates the variation in the size of holes formed as a function of the voltage across the flash lamp employing an apparatus which drilled the hole illustrated in FIGURE 3. The apparatus comprises a delay line including capacitors of 300 microfarads, inductances of 0.15 millihenries, an FX-45 xenon flash lamp, a 15 cm. x 1 cm. ruby crystal, a special 50× (0.56 NA) reflecting objective lens, and a 0.1 inch limiting aperture made of white paper.

Microscope 25 is also employed to obtain a precise determination of the spot on the surface of material 21 at which the hole is to be formed. The microscope is especially useful in applications requiring several holes that are to be accurately positioned. The precise position of the hole to be formed is determined in the following manner. Auto-collimator 27, mirror 30, and a wax smeared microscope cover glass are employed in a manner as hereinabove described for determining the focal point of the reflecting objective lens. Thus, microscope 25 is focused through the back of the cover glass onto the smeared front surface on which the image of the auto-collimator reticle has been focused. The cross hairs in the eyepiece 35 of microscope 25 are then adjusted to coincide with the image of the auto-collimator reticle. The wax smeared cover glass is then removed and the material to be pierced is put in place. This material can be translated perpendicular to the optical axis in a horizontal direction by means of adjustment screw 37 and in a vertical direction by means of adjustment screw 38. The material is translated in this transverse direction until the cross hairs of the microscope coincide with the location of the hole to be drilled. Lens 26 is then shielded by opaque lens 31 and an accurately positioned hole may then be formed. Opaque lens 31 is then again removed from lens 26 and the material translated so that the cross hairs of eyepiece 35 coincide with the location of the next hole to be formed.

From the foregoing description, it can be appreciated that my invention makes available a new method for forming extremely small holes through many types of material, and is especially suited for forming such holes in refractory materials such as tungsten and molybdenum which are noted to be notoriously poor for their machineability. The particular orientation of the components comprising the apparatus for forming these holes is another distinctive feature of my invention. My method for forming these small holes includes the steps of generating a pulsed laser beam which may be accurately controlled as to pulse duration and energy content and directing this beam through a limiting aperture which selects only the center part of the beam and may also produce a noncircular cross section of the beam if the particular application so requires. The well-collimated pulsed laser beam which passes through the limiting aperture is thence focused on the particular material to be pierced by means of a reflecting objective lens. The result is a formed hole whose extremely small size is predetermined.

Having described a new method for forming extremely small holes in accordance with my invention, it is believed obvious that other modifications and variations of my invention are possible in the light of the above teachings. For example, the laser device may comprise other suitable materials beside a ruby crystal, the principal requirement being that the laser material be adapted for relatively high power pulse operation of approximately 2 to 4 joules in the laser beam. In like manner, the flash lamp which functions as an optical pumping device for the laser may comprise other suitable intense light sources or other optically pumping techniques which may be accurately pulsed. Finally, techniques other than those disclosed may be employed to align the lens and material to be pierced. It is, therefore, to be understood that changes may be made in the particular embodiment of my invention described which are in the full intended scope of the invention as defined by the following claims.

What I claim as new and desire to secure by Letters Patent of the United States is:

1. A method of forming relatively small holes in a material wherein a pulsed beam of coherent light produced by a laser is focused on the material to be pierced by means of a reflecting objective lens comprising the steps of
positioning a material to be pierced at a selected point relative to the focal point of a reflecting objective lens,
controlling the amount of electrical energy to be utilized by a laser device in generating a pulsed laser beam whereby the size of the hole produced in the material by the laser beam varies with the amount of electrical energy,
adjusting the cross section of the laser beam to be generated by positioning a limiting aperture intermediate the laser device and the reflecting objective lens and along the optical axis of the laser beam, and
utilizing the controlled amount of electrical energy to generate a pulsed laser beam which passes through the limiting aperture and is focused on the material to be pierced by means of the reflecting objective lens whereby the highly concentrated energy of the focused pulsed laser beam pierces a relatively small hole through the material.

2. A method of forming relatively small holes in a material wherein a pulsed beam of coherent light produced by a laser is focused on the material to be pierced by means of a reflecting objective lens comprising the steps of
positioning a material to be pierced at the focal point of a reflecting objective lens,
controlling the amount of electrical energy to be utilized by a laser device in generating a pulsed laser beam whereby the size of the hole produced in the material by the laser beam varies with the amount of electrical energy,
adjusting the cross section of the laser beam to be generated by positioning a limiting aperture intermediate the laser device and the reflecting objective lens and along the optical axis of the laser beam, and
utilizing the controlled amount of electrical energy to generate a pulsed laser beam which passes through the limiting aperture and is focused on the material to be pierced by means of the reflecting objective lens whereby the highly concentrated energy of the focused pulsed laser beam pierces a relatively small hole through the material.

3. A method of forming relatively small holes in a material wherein a pulsed beam of coherent light produced by a laser is focused on the material to be pierced by means of a reflecting objective lens comprising the steps of positioning a material to be pierced at a selected distance removed from the focal point of a reflecting objective lens, controlling the amount of electrical energy to be utilized by a laser device in generating a pulsed laser beam whereby the size of the hole produced in the material by the laser beam varies with the amount of electrical energy, adjusting the cross section of the laser beam to be generated by positioning a limiting aperture intermediate the laser device and the reflecting objective lens and along the optical axis of the laser beam, and utilizing the controlled amount of electrical energy to generate a pulsed laser beam which passes through the limiting aperture and is focused on the material to be pierced by means of the reflecting objective lens whereby the highly concentrated energy of the focused pulsed laser beam pierces a relatively small hole through the material.

4. A method of forming relatively small holes in a material wherein a pulsed beam of coherent light produced by a laser is focused on the material to be pierced by means of a reflecting objective lens comprising the steps of positioning a material to be pierced at the focal point of a reflecting objective lens, controlling the amount of electrical energy to be utilized by a laser device in generating a pulsed laser beam whereby the size of the hole produced in the material by the laser beam varies with the amount of electrical energy, reducing the cross section of the laser beam to be generated to a desired area by positioning a limiting aperture intermediate the laser device and the reflecting objective lens and along the optical axis of the laser beam, and utilizing the controlled amount of electrical energy to generate a pulsed laser beam which passes through the limiting aperture and is focused on the material to be pierced by means of the reflecting objective lens whereby the highly concentrated energy of the focused pulsed laser beam pierces a relatively small hole through the material.

5. A method of forming relatively small holes in a material wherein a pulsed beam of coherent light produced by a laser is focused on the material to be pierced by means of a reflecting objective lens comprising the steps of positioning a material to be pierced at a selected distance removed from the focal point of a reflecting objective lens, controlling the amount of electrical energy to be utilized by a laser device in generating a pulsed laser beam whereby the size of the hole produced in the material by the laser beam varies with the amount of electrical energy, controlling the shape of the cross section and reducing the cross sectional area of the laser beam to be generated by positioning a limiting aperture intermediate the laser device and the reflecting objective lens and along the optical axis of the laser beam, and utilizing the controlled amount of electrical energy to generate a pulsed laser beam which passes through the limiting aperture and is focused on the material to be pierced by means of the reflecting objective lens whereby the highly concentrated energy of the focused pulsed laser beam pierces a relatively small hole through the material, the shape of the hole being determined by the shape of the limiting aperture.

6. A method of forming holes at least as small at 0.001 inch in diameter in material such as tungsten, molybdenum, and the like wherein a pulsed laser beam produced by a laser is focused on a material to be pierced by means of a reflecting objective lens comprising the steps of aligning the optical axis of a reflecting objective lens with the optical axis of a laser beam to be generated as a first preliminary step, and detecting the focal point of the reflecting objective lens as a second preliminary step wherein the detection step comprises the focussing of a microscope on a light-sensive surface intermediate the reflecting objective lens and the microscope, positioning a material to be pierced intermediate the reflecting objective lens and the microscope and in a direction axially along the optical axis of the laser beam to be generated, adjusting the position of the material in a direction transverse to the optical axis of the laser beam whereby the point at which a hole is to be pierced through the material is accurately determined, controlling the amount of electrical energy to be utilized by a laser device in generating the laser beam whereby the size of the hole produced in the material by the laser beam varies with the amount of electrical energy, adjusting the cross section of the laser beam to be generated by positioning a limiting aperture intermediate the laser device and the reflecting objective lens and along the optical axis of the laser beam, and utilizing the controlled amount of electrical energy to generate a pulsed laser beam which passes through the limiting aperture and is focused on the material to be pierced by means of the reflecting objective lens whereby the focused pulsed laser beam which is characterized by a high energy may pierce a hole at least as small as 0.001 inch diameter through the material.

7. A method of forming holes at least as small as 0.001 inch in diameter in material such as tungsten, molybdenum, and the like wherein a pulsed laser beam produced by a laser is focused on a material to be pierced by means of a reflecting objective lens comprising the steps of aligning the optical axis of a reflecting objective lens with the optical axis of a laser beam to be generated as a first preliminary step, and detecting the focal point of the reflecting objective lens as a second preliminary step wherein the detection step comprises the focussing of a microscope on a light-sensitive surface intermediate the reflecting objective lens and the microscope, positioning a material to be pierced intermediate the reflecting objective lens and the microscope and at the focal point of the reflecting objective lens and in a direction axially along the optical axis of the laser beam to be generated, adjusting the position of the material in a direction transverse to the optical axis of the laser beam whereby the point at which a hole is to be pierced through the material is accurately determined, controlling the amount of electrical energy to be utilized by a laser device in generating the laser beam whereby the size of the hole produced in the material by the laser beam varies with the amount of electrical energy, reducing the area of the cross section of the laser beam to be generated by positioning a limiting aperture intermediate the laser device and the reflecting objective lens and along the optical axis of the laser beam, and utilizing the controlled amount of electrical energy to generate a pulsed laser beam which passes through the limiting aperture and is focused of the material to be pierced by means of the reflecting objective lens whereby the focused pulsed laser beam which is characterized by a high energy may pierce a hole at least as small as 0.001 inch diameter through the material.

8. A method of forming holes as least as small as 0.001 inch in diameter in material such as tungsten, molybdenum, and the like wherein a pulsed laser beam produced by a laser is focused on a material to be pierced by means of a reflecting objective lens comprising the steps of aligning the optical axis of a reflecting objective lens with the optical axis of a laser beam to be generated as a first preliminary step, and detecting the focal point of the reflecting objective lens as a second preliminary step wherein the detection step comprises the focussing of a microscope on an image impinging on a light-sensitive surface intermediate the reflecting objective lens and the microscope, positioning a material to be pierced intermediate the reflecting objective lens and the microscope and at a selected distance removed from the focal point of the reflecting objective lens and in a direction axially along the optical axis of the laser beam to be generated, adjusting the position of the material in a direction transverse to the optical axis of the laser beam whereby the point at which a hole is to be pierced through the material is accurately determined, controlling the amount of electrical energy to be utilized by a laser device in generating the laser beam whereby the size of the hole produced in the material by the laser beam varies with the amount of electrical energy, reducing the cross-sectional area and controlling the cross-sectional shape of the laser beam to be generated by positioning a limiting aperture intermediate the laser device and the reflecting objective lens and along the optical axis of the laser beam, and utilizing the controlled amount of electrical energy to generate a pulsed laser beam which passes through the limiting aperture and is focused on the material to be pierced by means of the reflecting objective lens whereby the focused pulsed laser beam which is characterized by a high energy may pierce a hole at least as small as 0.001 inch diameter through the material.

9. A method of forming a relatively small hole through an accurately determined position on the surface of a material wherein a pulsed beam of coherent light produced by a laser is focused on a first side of the material to be pierced by means of a reflecting objective lens and a microscope is disposed on the opposite side of the material comprising the steps of aligning the optical axis of a reflecting objective lens with the optical axis of a laser beam to be generated as a first preliminary step, and detecting the focal point of the reflecting objective lens as a second preliminary step wherein the detection step comprises directing a beam of light having a distinguishing image in cross section in the direction of the reflecting objective lens and along the optical axis of the laser beam to be generated, mounting a light-sensitive transparent member in a retaining member intermediate the reflecting objective lens and a microscope whereby the light beam image impinges thereon, adjusting the position of the reflecting objective lens to obtain the sharpest focus of the image as detected by the microscope to thereby determine the focal point of the reflecting objective lens, and removing the light-sensitive transparent member from the retaining member, inserting a material to be pierced in the retaining member disposed intermediate the reflecting objective lens and the objective lens of the microscope, adjusting the position of the reflecting objective lens in an axial direction along the optical axis of the laser beam to be generated whereby the material to be pierced is accurately located at a selected distance relative to the focal point of the reflecting objective lens, sighting through the eyepiece of the microscope and adjusting the position of the retaining member in a direction transverse to the optical axis of the laser beam to accurately determine the point at which a hole is to be formed through the material, positioning an opaque shield adjacent the outer side of the objective lens of the microscope to protect the objective lens from any material which may be splattered as the hole is being produced through the material, adjusting the output voltage of a power supply to a selected magnitude and thereby controlling the amount of electrical energy to be utilized by a laser device in generating a pulsed laser beam whereby the size of hole produced in the material by the laser beam varies with the amount of electrical energy, reducing the cross section of the laser beam to be generated by positioning a limiting aperture intermediate the laser device and the reflecting objective lens and along the optical axis of the laser beam, and utilizing the controlled amount of electrical energy to generate a pulsed laser beam which passes through the limiting aperture and is focused on the material to be pierced by means of the reflecting objective lens whereby the highly concentrated energy of the focused pulsed laser beam pierces a hole through the material and the size of the hole is primarily determined by the magnitude of the output voltage of the power supply, the distance between the focal point of the reflecting objective lens and the material being pierced, the size of the limiting aperture, and the color of the surface of the material being pierced.

10. In an apparatus adapted to form relatively small holes in a material by means of a pulsed beam of coherent light which is focused on the material to be pierced comprising a housing adapted to contain a laser material therein, said housing having an aperture in one end thereof disposed along the optical axis of the laser material, a source of controllable voltage, means for utilizing the output of said voltage source in generating a pulsed laser beam which is emitted from said housing aperture, a limiting aperture disposed intermediate said housing aperture and a reflecting objective lens and along the optical axis of the laser, and retaining means adjustably positionable at a selected point relative to the focal point of the reflecting objective lens for holding a material to be pierced by a pulsed laser beam emitting from said housing aperture and passing through the limiting aperture and being focused on the material to be pierced by the reflecting objective lens.

11. In an apparatus adapted to form relatively small holes in a material wherein a pulsed beam of coherent light produced by a laser device is focused on the material to be pierced by means of a reflecting objective lens comprising a housing having a reflective inner surface and adapted to contain a rod of laser material and a flash lamp therein, said housing having an aperture in one end thereof disposed along the optical axis of the laser material through which the output of the laser may be emitted from said housing, a source of controllable voltage, a pulse shaping network, input to said pulse shaping network connected to source, said pulse shaping network being connected across a flash lamp, a limiting aperture disposed intermediate the aperture of said housing and a reflecting objective lens and along the optical axis of the laser, retaining means adjustably positionable at a selected point relative to the focal point of the reflecting objective lens for holding a material to be pierced by a pulsed laser beam emitting from the aperture in the housing and passing through the limiting aperture and being focused on the material to be pierced by the reflecting objective lens.

References Cited by the Examiner

UNITED STATES PATENTS

| 2,571,743 | 10/1951 | Meyer | 88—57 |
| 2,730,004 | 1/1956 | Badger et al. | |
| 2,861,166 | 11/1958 | Cargill | 219—68 |

RICHARD M. WOOD, *Primary Examiner.*

ANTHONY BARTIS, JOSEPH V. TRUHE, *Examiners.*